(12) United States Patent
Frank (10) Patent No.: US 9,482,206 B2
(45) Date of Patent: Nov. 1, 2016

(54) ROLLING BEARING ARRANGEMENT (75) Inventor: Hubertus Frank, Höchstadt (DE)

(73) Assignee: IMO Holding GmbH (DE)

( * ) Notice: Subject to any disclaimer, the term of this patent is extended or adjusted under 35 U.S.C. 154(b) by 1225 days.

(21) Appl. No.: 12/312,057

(22) PCT Filed: Oct. 31, 2007

(86) PCT No.: PCT/EP2007/009484
§ 371 (c)(1),
(2), (4) Date: Nov. 27, 2009

(87) PCT Pub. No.: WO2008/052778
PCT Pub. Date: May 8, 2008

(65) Prior Publication Data
US 2010/0067838 A1 Mar. 18, 2010

(30) Foreign Application Priority Data

Oct. 31, 2006 (DE) .................... 20 2006 016 813 U
Aug. 17, 2007 (DE) .................... 20 2007 011 577 U (51) Int. Cl.
| | |
|---|---|
| F16C 19/18 | (2006.01) |
| F16C 19/49 | (2006.01) |
| F16C 19/56 | (2006.01) |
| F03D 11/00 | (2006.01) |
| F16C 19/50 | (2006.01) |

(52) U.S. Cl.
CPC ........... *F03D 11/0008* (2013.01); *F16C 19/18* (2013.01); *F16C 19/49* (2013.01); *F16C 19/505* (2013.01); *F05B 2240/57* (2013.01); *F16C 2300/14* (2013.01); *Y02E 10/721* (2013.01); *Y02E 10/722* (2013.01)

(58) Field of Classification Search
CPC .... F16C 19/381; F16C 19/49; F16C 19/505; F16C 19/545

USPC ...... 384/452–455; 416/147, 204 R, 205, 246
See application file for complete search history.

(56) References Cited

U.S. PATENT DOCUMENTS

| | | | | |
|---|---|---|---|---|
| 949,928 | A | * | 2/1910 | Grooms ........................ 384/454 |
| 3,258,301 | A | * | 6/1966 | Porvatov ....................... 384/454 |
| 3,302,986 | A | * | 2/1967 | Grolman et al. ............. 384/452 |
| 3,652,141 | A | * | 3/1972 | Husten et al. ................ 384/455 |
| 3,748,002 | A | * | 7/1973 | Barker et al. ................. 384/453 |
| 4,422,697 | A | * | 12/1983 | Gugel et al. .................. 384/452 |

FOREIGN PATENT DOCUMENTS

| | | |
|---|---|---|
| DE | 39 05 986 | 7/1990 |
| EP | 0158015 | 10/1985 |

* cited by examiner

*Primary Examiner* — Phillip A Johnson
(74) *Attorney, Agent, or Firm* — Pandiscio & Pandiscio (57) ABSTRACT

The invention is directed to a rolling bearing arrangement comprising two annular elements that are arranged mutually concentrically and at least regionally inside each other, for connection each to a respective one of two oppositely rotatable system components, and comprising a gap between said connecting elements, such that they are able to rotate in opposite directions about an imaginary axis located at the center of the annular connecting elements and extending approximately perpendicular to the ring plane, wherein at least two rows of rolling bodies are provided in the region of the gap between the connecting elements, wherein the annular connecting elements completely or partially overlap each other in the radial direction and one or more raceways for rolling bodies are arranged in radially overlapping regions of the annular connecting elements, in such a way that the contact angle which the connecting line between the centers of the points of contact of a rolling body with its two raceways makes with the ring plane is equal to or greater than 75°, and wherein the rolling bodies of at least one row have a contact angle of 15° or less.

30 Claims, 3 Drawing Sheets

ROLLING BEARING ARRANGEMENT

The invention is directed to a rolling bearing arrangement, preferably to a large rolling bearing having a diameter of 0.5 m or more, for example for a rotary joint, particularly in the context of a blade bearing for a wind power installation, and comprising two annular elements arranged mutually concentrically and at least regionally inside each other, for connection each to a respective one of two oppositely rotatable system components, and comprising a gap between said connecting elements, such that they are able to rotate in opposite directions about an imaginary axis located at the center of the annular connecting elements and extending approximately perpendicular to the ring plane, at least two rows of rolling bodies being provided in the gap between the connecting elements.

Large rolling bearings, i.e., those roughly 0.5 m or more in diameter, are, in many applications, frequently subjected to particularly high forces or torques perpendicular to their base plane, which they are unable to withstand without deforming. One example is provided by construction vehicles, for instance excavators, in which the rotating cab of the vehicle is connected to the chassis by a large rolling bearing and simultaneously carries the shovel of the excavator, so the forces acting on the shovel during the dragging and lifting of loads have to be absorbed by the large rolling bearing. Much higher stresses, however, are imposed on the large rolling bearings used in wind power installations. For example, each rotor blade is usually connected to the hub by its own large rolling bearing, so that the position of the blades can be adjusted to the force of the wind. If the wind force remains relatively constant over time, this setting is not changed: the bearing of the blade is not rotated, even though it may be exposed to very high wind loads. In absorbing such loads, the rings of a bearing deform, although not both in the same direction, but in different ways. For example, mere axial loading of a bearing having a standard contact angle of between 35° and 70° subjects the rolling bodies to a radial component of the load. Since the rolling bodies deform in the process, the result, between the two rings, is an expansion of the outer ring and a simultaneous contraction of the inner ring. Under complex loading, where an axial load is accompanied by radial and/or tilting-moment loads, the deformation produced can, for example, be such that the outer ring assumes an elliptical shape and the inner ring also deforms elliptically, but the two ellipses are offset from each other by 90°. Pronounced deformation of this kind carries a number of fraught disadvantages: for one thing, it causes a considerable increase in friction torque, since the rolling bodies have to deform on each rotational movement of the rolling bearing and, in addition, lubricant is expelled at the overloaded rolling bodies and the lubricating film consequently separates there—precisely, in part, because large rolling bearings of this kind are often under load when stopped. For another thing, in sealed bearings, this severe deformation of the rings causes, in response to alternating loads, a strong pumping action that subjects the lubricant to high local pressures, inevitably leading to increased leakage. In sum, these deleterious effects reduce the operating life of such a large rolling bearing, resulting in not inconsiderable expense, not only in the form of the associated replacement costs, but also due to the downtime for the damaged installation.

These disadvantages of the described prior art have given rise to the problem initiating the invention, that of improving a rolling bearing, particularly a large rolling bearing, in such a way that the operating life of the rolling bearing is maximal even under unfavorable load conditions, i.e., with a low rotation rate or even frequent stoppages that may often occur at roughly identical angles of rotation, and under heavy axial, radial and/or tilting-moment loads.

This problem is solved by the fact that the annular connecting elements completely or partially overlap each other in the radial direction and one or more raceways for rolling bodies are arranged in radially overlapping regions of the annular connecting elements in such a way that the contact angle which the connecting line between the centers of the points of contact of a rolling body with its two raceways makes with the ring plane is equal to or greater than 75°, for example equal to or greater than 80°, preferably equal to or greater than 85°, particularly equal to or greater than 88° or approximately exactly 90°; such a row of rolling bodies will be referred to hereinafter as a "high-contact-angle row of rolling bodies"; and wherein the rolling bodies of at least one (other) row have a contact angle of 15° or less, for example 10° or less, preferably 5° or less, particularly 2° or less; such a row of rolling bodies will be referred to hereinafter as a "low-contact-angle row of rolling bodies."

The invention therefore comprises a plurality of steps. First, a region of radial overlap is created between the two connecting elements, which, in and of itself, is thoroughly unusual for a large rolling bearing with connecting rings arranged radially inside each other (an inner ring and an outer ring); this region of overlap is then used to increase the contact angle to approximately 90°. The overall raceway geometry must be taken into account in the process. The radius of curvature of a raceway, measured transversely to the direction of roll, is usually slightly larger than the radius of a ball, thus resulting in a defined, nearly punctiform region of contact. The contact angle can be obtained from the relative positions of the centers of the two raceway cross sections and of the balls: if these centers are mutually offset in approximately the axial direction, i.e., parallel to the axis of rotation of the rolling bearing, but in opposite directions, i.e., the center of the lower raceway is located above the center of the upper raceway within a common cross-sectional plane, then these centers span a connecting line in whose middle region the center of a ball is approximately located when the ball passes through this particular cross-ssectional plane. If this connecting line, whose angle with the base plane of the rolling bearing corresponds to the contact angle, is exactly or at least approximately parallel to the axis of rotation of the bearing, then axial forces will be transmitted by the bearing rings without generating a radial force component that deforms the rings. This also applies to tilting moments, which are basically equivalent to asymmetrical axial loading. Since the rings of rolling bearings usually lie flat against the machine or system components to which they are connected, and thus receive additional bracing in their axial direction, they are otherwise relatively insensitive to pure axial loading. The deformation of the oppositely rotatable bearing rings can thus be reduced considerably by this measure. The low-contact-angle row of rolling bodies serves primarily to transmit radial forces or to center the two connecting elements in relation to each other. It should be noted that a contact angle of 15° represents an upper limit in this regard, the preferred values being around 0°, i.e., less than 5° or even less than 2°. In this way, the influences of external radial forces are largely decoupled from those of external axial forces, i.e., external radial forces do not generate any internal axial forces in the bearing and external axial forces do not generate any internal radial forces.

It has proven favorable for one annular connecting element to have at least one circumferential region that faces the other and at least one flank of which is embraced at least regionally by the other connecting element. Such a flank forms a region of radial overlap with that region of the other connecting element which laterally embraces it, with the possibility of disposing in this region at least one row of rolling bodies whose contact angle can be set at approximately 90°. Since a mere single-overlap region between the oppositely rotatable connecting elements makes it possible to transmit only axial forces in the pushing direction, the invention provides, in a refinement, that one annular connecting element has at least one circumferential region that faces the other and both flanks of which are embraced at least regionally by the other connecting element. With such a double overlap, in which a region of one connecting element is overlapped on both flank sides, at least two rows of rolling bodies can be arranged in the bearing in order to transmit axial forces both in the pushing direction and in the pulling direction.

At least one circumferential region of a connecting element that is embraced flankwise by the respective other connecting element can be configured as a circumferential projection that projects radially toward the other connecting element, with the result that the particular ring need not be embraced in its entirety, but only at a flange of reduced axial height that runs along its jacket side facing the bearing gap, such that despite the (partial) radial overlap in the region of such a flange, the overall structural size of the bearing in the axial direction, i.e., perpendicular to its base plane, does not have to be chosen to be greater than in the case of a conventional bearing of comparable structural size.

The invention further provides that the embraced flank(s) of at least one projection is (are) configured as raceway(s) for rolling bodies. In this way, the invention makes use of the possibility, afforded by the radial overlap, of providing radially overlapping raceways, thus making it possible to operate the rolling bodies with a contact angle of nearly 90°.

The invention can be refined by providing at least one raceway for at least one further row of rolling bodies in the end face of at least one projection. These additional rolling bodies of this additional row thus roll between two raceways of the connecting elements that are incorporated into two mutually opposite jacket surfaces in the region of the ring gap and are therefore offset from each other in the radial direction, referred to the axis of rotation of the rolling bearing. This additional row of the rolling bearing thus is capable of transmitting radial forces between the rings, and a bearing equipped with it is therefore suitable for all conceivable load cases.

It is within the scope of the invention that one annular connecting element has an approximately C-shaped cross section having at least two circumferential regions that face the other connecting element, and into the intervening space between which a region of the other connecting element extends. This cross-sectional geometry makes it possible for such a connecting element to embrace a circumferential projection of the other connecting element on both flanks and consequently to form a double overlap. Since the two regions of overlap have a mirror-image structure with respect to an approximately central base plane of the particular rolling bearing, a bearing arrangement by means of which the pushing forces can be transmitted in both axial directions can be realized in this way.

To this end, the invention provides that a respective raceway for a row of rolling bodies is disposed on each of the mutually facing inner surfaces of the connecting element of C-shaped cross section, particularly on the mutually facing flanks of its raised regions. These raceways each form the counterpart to a respective raceway on the embraced projection of the other connecting element. As counterparts, they have the same cross-sectional geometry as their mating raceways on the embraced projection of the first connecting element.

The invention is further susceptible to refinement by providing a raceway for at least one further row of rolling bodies in the region of at least one depression between two raised regions of the connecting element of C-shaped cross section. This raceway serves as the counterpart to the additional raceway in the end face of the embraced projection of the other connecting element; it is therefore preferably disposed at the bottom of a circumferential, groove-shaped depression between two raised regions. As the counterpart, it has the same cross-sectional geometry as its mating additional raceway on the other connecting element.

The assembly of the two intermeshing connecting elements is simplified by the fact that one annular connecting element, preferably the one with a C-shaped cross section, is composed of at least two mutually separate, superposed individual rings. In this way, the two halves or individual rings of the connecting element of C-shaped cross section can be taken apart temporarily and then be put back together so that they surround the other connecting element on both sides, this operation being accompanied, if appropriate, by the simultaneous insertion of the rows of rolling bodies, for example each held together by a respective cage.

It is within the scope of the invention for the connecting element of C-shaped cross section to embrace the other one radially inwardly and/or outwardly. As explained below, particular importance is accorded to such a bearing structure having a connecting element that is embraced bilaterally, i.e. both radially inwardly and outwardly (with respect to the axis of rotation of the bearing).

The radial overlap width w should be greater than half the extent of the rolling bodies in the radial direction, referred to the ring rotation axis of the rolling bearing, so that the rolling bodies are not subjected to any shear loads. In the case of spherical rolling bodies, this design precept is synonymous with a radial overlap width that is greater than the radius of the ball. A preferred value for the radial overlap width is about 1.5 times the radius of the ball or greater.

In total, at least two rows of rolling bodies that are mutually offset in the axial direction should be provided. To the extent that the raceways on the two connecting elements for these two rows of rolling bodies are arranged to be mirror images of each other with respect to an approximately central base plane of the rolling bearing, axial pushing forces are transmitted in one direction by the rolling bodies of one row, whereas the rolling bodies of the other row serve to transmit axial pushing forces in the opposite direction.

The invention is further distinguished by at least two rows of rolling bodies each having a contact angle of 75° or more, for example 80° or more, preferably 85° or more, particularly 88° or more. As a result of such a high contact angle, these rows of the rolling bearing are capable of transmitting axial forces without simultaneously generating excessive radial forces. It should be noted that a contact angle of 75° is to be considered the lower limit here; the preferred value is instead a contact angle of about 90°, i.e., between 85° or even 88° and 90°.

The high-contact-angle rolling bodies can be configured as balls, which form nearly punctiform contact areas with their raceways, making it possible to select the radial overlap width as smaller than the extent of the rolling bodies in the radial direction, referred to the axis of rotation of the rolling bearing. Since in the case of roller-shaped or (slightly)

cone-shaped rolling bodies, the contact areas are configured as linear and ideally extend over the entire length of a roller, such rolling bodies do not permit an equivalent reduction of the overlap width.

The low-contact-angle rolling bodies can be configured as roller-shaped, cone- or drum-shaped, or spherical, since, in their case, linear contact areas extend parallel to the axis of rotation of the rolling bearing and thus have no effect on the radial overlap width.

It has proven favorable for at least one row of low-contact-angle rolling bodies to be arranged between two rows of high-contact-angle rolling bodies. For reasons of stability, the projection projecting into a circumferential, groove-shaped recess in the other connecting element must have a certain minimum extent in the direction parallel to the axis of rotation of the rolling bearing. The free end face of this projection therefore has a certain minimum width. It makes sense, therefore, to use this space for the additional row of the rolling bearing, in order to keep the overall structural height of the bearing to a minimum.

Such an additional row of low-contact-angle rolling bodies can be disposed approximately at the level of the split in the connecting element of C-shaped cross section, making it possible to insert these rolling bodies without difficulty during assembly.

It is within the scope of the invention that the connecting elements are offset in the radial direction with respect to each other and/or are configured such that on one base side of the rolling bearing, the end face of one connecting element, for example the end face of the outer connecting element, is raised, whereas on the opposite base side, the same is true of the end face of the other connecting element, for example of the radially inwardly disposed connecting element. In this way, such a rolling bearing can be fitted directly between planar, mutually parallel surfaces of two oppositely rotatable system and/or machine components without the need to provide special structures on these components, since each annular connecting element then rests against only one of the two system and/or machine components.

The invention affords the possibility of configuring the bearing in such a way that on one base side of the rolling bearing, the end face of the connecting element that is raised on that side completely embraces the end face of the other connecting element in the radial direction. This measure makes it possible to leave the end face of the bearing free of bearing gaps, specifically by having one annular connecting element completely embrace the other on one base side of the rolling bearing.

If, moreover, one annular connecting element embraces the other both radially inwardly and radially outwardly, i.e., bilaterally, then the orifices of the bearing gap are both shifted together into the region of a common end face of the bearing, thus making for particular visual simplicity.

Carrying this design precept farther, both the radially inward jacket surface of the bilaterally embraced connecting element and its radially outward jacket surface can be provided with a respective circumferential region that faces the other connecting element and the two flanks of which are each embraced at least regionally by the other connecting element. Each pair of oppositely disposed flanks is capable of absorbing or transmitting axial forces and/or tilting moments in both directions, making it possible, by a measure of this kind, to devise a bearing whose load capacity is increased multifold, for example doubled.

The flankwise-embraced, circumferential regions of the bilaterally embraced connecting element can be configured as circumferential projections that project both radially inward, on the one side, and radially outward, on the other side, toward the bilaterally embracing connecting element. This gives the bilaterally embraced connecting element a T-shaped or †-shaped or +-shaped cross section, both ends of the crossbar being embraced by the bilaterally embracing connecting element.

Particular advantages are gained by giving the bilaterally embracing and/or the bilaterally embraced connecting element(s) (each) a symmetrical cross section with respect to an axis of symmetry that is parallel to the axis of rotation of the bearing. Due to the matching geometry of the outer and inner halves concerned, this measure ensures a uniform distribution of forces within the bearing rings, thus eliminating the risk of overloading one region of the bearing. The structural height of the bearing can be minimized as a result.

The invention recommends providing in the gap between the bilaterally embracing and the bilaterally embraced connecting element at least two pairs of high-contact-angle rows of rolling bodies, which rows are disposed opposite each other in relation to a central base plane. In this way, equal use is made of both projections of the bilaterally embraced element for force and torque transmission.

Further advantages are afforded by at least one further row of high-contact-angle rolling bodies extending on the opposite side of the bilaterally embraced connecting element from its connection face. This increases at least the transmission of axial pushing forces.

The invention is further distinguished by at least one row of low-contact-angle rolling bodies extending along the radially inward and/or the radially outward end face of the bilaterally embraced connecting element. Since the rows of high-contact-angle rolling bodies are optimized particularly for the transmission of axial forces and/or tilting moments, it is advisable to provide another row of rolling bodies capable, at least to a limited extent, of transmitting radial forces. These can be balls or rollers, depending on the construction of the whole; and their diameter can be approximately equal to or greater than the diameter of the high-contact-angle rolling bodies, depending on the load conditions.

To fasten the rolling bearing to the oppositely rotatable system components, the connecting elements should have coronally distributed bores for receiving fastening screws. Large rolling bearings can merely be fixed by a multiplicity of machine screws in order to transmit axial pulling forces and to generate sufficient normal force to create a friction lock between the rolling bearing and the attached system component or machine component. The fastening bores can be configured either as through-bores, in which case the machine screws must be secured by nuts or other threaded elements, or they can be internally threaded blind bores, in which case the fastening screws are fixed directly in the bores. The mounting of a connecting element that is embraced bilaterally, i.e., on both its radially inward jacket surface and its outward, peripheral jacket surface, is simplified if these fastening bores are configured as internally threaded blind bores.

The gap between the two connecting elements can be sealed on both base sides of the rolling bearing, preferably by means of at least one sealing ring per side, disposed in the region of the step between the raised connecting element and the respective other connecting element. Sealing of this kind performs various functions: on the one hand, dirt particles are kept out of the sensitive rolling bodies and raceways; on the other hand, lubricant is prevented from escaping. It is therefore possible to fill the preferably sealed gap between the two connecting elements with a lubricant, particularly with grease. The thus-sealed cavity between the two connecting elements can be filled not just partially, but also largely or even completely with lubricant. If one or both seals are configured so that they close reliably in response to inwardly directed pressure, but open in response to outwardly directed pressure, at least when a pressure threshold is exceeded, then spent lubricant can escape through such a seal when fresh grease is injected into the sealed cavity through a lubricating nipple provided for this purpose, making it possible to lubricate or grease the bearing after it is in place without having to disassemble it in any way.

Finally, it is within the teaching of the invention that a jacket side of at least one connecting element that faces away from the common gap is provided with a set of teeth. This simultaneously creates the possibility of definedly specifying the twist angle between the two connecting elements by means of a drive, in which case the drive shaft is coupled to the toothed connecting element via at least one pinion, worm gear, or the like, which meshes with the teeth, whereas the housing of the drive element is preferably fastened to the other connecting element or to a machine component or system component connected thereto.

Other features, details, advantages and effects based on the invention will become apparent from the following description of preferred embodiments of the invention and by reference to the drawing. Therein.

Figure 1:
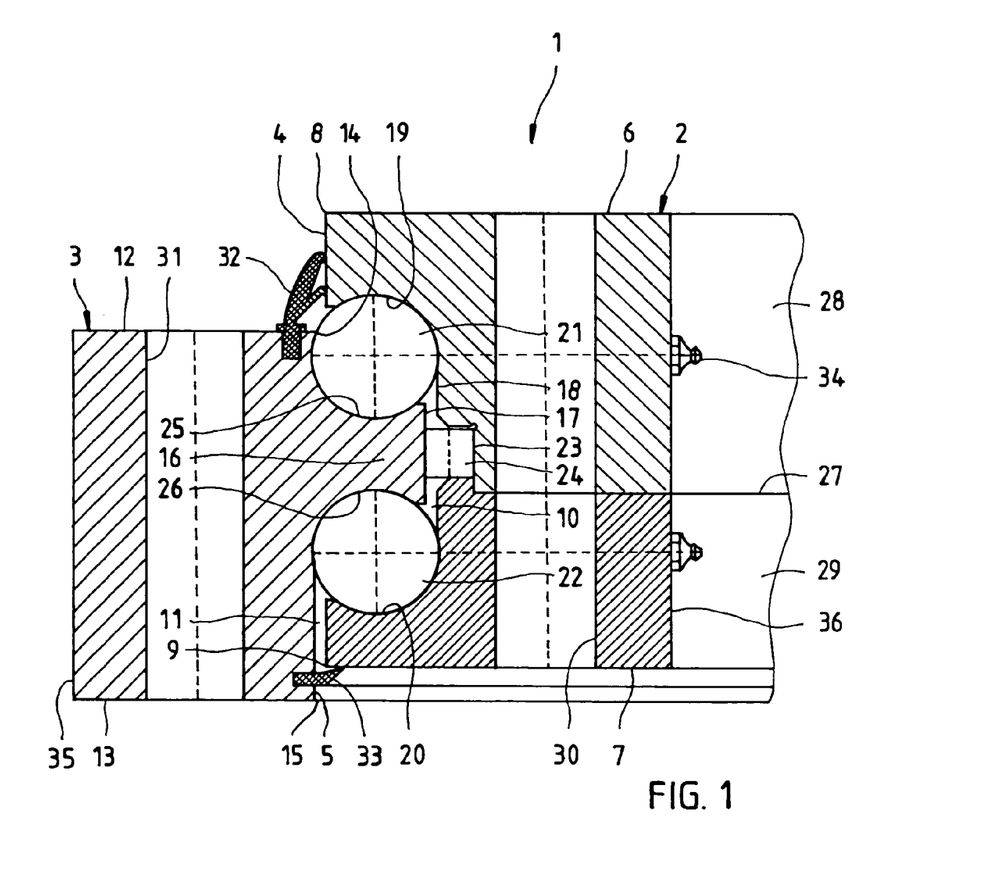
FIG. 1 is a cross section through a rolling bearing according to the invention, partially broken away.

The rolling bearing 1 of FIG. 1 includes two circularly annular elements 2, 3, for connection each to a respective one of two oppositely rotatable system and/or machine components. The two connecting elements 2, 3 have different center radii. It is therefore possible to arrange the connecting elements 2, 3 approximately in their common plane in such a way that connecting element 2, having the smaller radius, lies inside connecting element 3, which has the larger radius. Thus, the designations "inner ring 2" and "outer ring 3" may also be used below for the sake of simplification.

However, the maximum outer radius $r_{1,o,max}$ of the first or inner ring 2 is greater than the minimum inner radius $r_{2,i,min}$ of the second or outer ring 3. There is consequently a region of radial overlap having an overlap width w:

$$w = r_{1,o,max} - r_{2,i,min}$$

This overlap is created by the fact that the mutually facing jacket sides 4, 5 of the two rings 2, 3 have respective circumferential elevations and/or depressions. The outward jacket surface 4 of inner ring 2 forms a circular-ring-shaped edge 8, 9 with the upper end face 6 and the lower end face 7, respectively of inner ring 2. These circular edge lines 8, 9 surround the axis of rotation of the rolling bearing preferably at approximately equal radii $r_{1,o,max}$, such that the upper and the lower portions of the jacket surface 4 are aligned with each other and thus lie on a common circular cylinder. Between them, however, the jacket surface 4 is set back toward the axis of rotation of the rolling bearing to form a circumferential, groove-shaped depression 10.

On the other side of the gap 11 of the rolling bearing, radially outside the jacket surface 4 of inner ring 2, outer ring 3 is in contact via its inward jacket surface 5. The latter forms a circular-ring-shaped edge 14, 15 with the upper face 12 and the lower face 13, respectively, of outer ring 3. These circular edge lines 14, 15 surround the axis of rotation of the rolling bearing at preferably approximately equal radii $r_{2,i,max}$. Between them, however, the jacket surface 5 projects radially inward toward the axis of rotation of the rolling bearing to form a circumferential, spring-like elevation 16. This is accommodated within the groove-shaped depression 10, since the latter has a larger cross section than the elevation 16. The radially innermost boundary surface 17 of circumferential elevation 16 extends along a cylinder jacket of radius $r_{2,i,min}$. Since elevation 16 engages in depression 10, it holds that:

$$r_{1,o,max} > r_{2,i,min}$$

Rolling bearing 1 has a total of three rows of rolling bodies. Thus, on each of the two annular connecting elements 2, 3 there are three raceways, one for each row of rolling bodies. On the inner ring 2, these three raceways are arranged within the circumferential depression 10; on the outer ring, they are all adjacent to the circumferential elevation 16.

The depression 10 in the jacket surface 4 of inner ring 2 has a groove-shaped cross section, with an annular bottom surface 18, whose shape might be approximated for example by a cylinder jacket surface concentric to the axis of rotation of the rolling bearing, and two thereto-adjacent flanks 19, 20, which ultimately terminate at the upper and the lower portion, respectively, of the jacket surface 4. These flanks 19, 20 each form the raceway for a respective row of rolling bodies 21, 22, while the third raceway 23, for the third row of rolling bodies 24, is located at the bottom 18 of the groove-shaped depression 10. Serving as the counterparts to the first two raceways 19, are, respectively, the two flanks 25, 26 of the circumferential elevation 16 of outer ring 3, while the third raceway 23 has its counterpart at the boundary surface 17 of the elevation 16.

Thus, between a given flank 19, 20 of the depression 10 in the outer jacket surface 4 of inner ring 2 and a respective flank 25, 26 of the elevation 16 on the inner jacket surface there is a respective row of rolling bodies 21, 22 configured as balls, preferably of equal radius $r_B$ in each case. The raceways 19, 20, 25, 26 provided for this purpose each have a cross section that extends along a portion of a circular line, but with a transverse radius of curvature $r_{1,R}, r_{2,R}$, it being the case that:

$$r_{1,R} = r_{2,R} > r_B,$$

where
$r_{1,R}$=transverse radius of curvature of raceway 19, 20 on inner ring 2;
$r_{1,R}$ [sic]=transverse radius of curvature of raceway 25, 26 on outer ring 3.

The difference is nevertheless minimal, and virtually imperceptible to the naked eye; the minimal discrepancy between $r_R$ and $r_B$ serves the purpose of making it possible to limit the points of contact of the balls 21, 22 with their raceways 19, 20, 25, 26 to nearly punctiform regions, whose position is determined by the relative positions of the centers $C_B, C_{1,R}, C_{2,R}$.

If one considers the cylinder coordinates z, r, of which the z-axis extends concentrically to the axis of rotation of the rolling bearing, while the r-coordinates represent the distance from that axis, then the centers $C_B, C_{1,R}, C_{2,R}$ can be expressed in terms of their z- and r-coordinates:

$$C_B(z_{CB}, r_{CB});$$

$$C_{1,R}(z_{C1,R}, r_{C1,R});$$

$$C_{2,R}(z_{C2,R}, r_{C2,R}).$$

Based on these coordinates, a preferred design precept of the invention can be defined as follows:

$$r_{C1,R} = r_{C2,R} = r_{CB}$$

$$z_{C1,R} = z_{C2,R} = r_{1,R} + r_{2,R} - 2 \cdot r_B$$

This means that in the ideal case, the centers $C_B$, $C_{1,R}$, $C_{2,R}$ all lie on a common cylinder jacket surface about the z-axis/bearing rotation axis of radius $r_{CB}$. Consequently, the centers $$C_{A1,u}(z_{A1,u}, r_{A1,u});$$

$$C_{A1,l}(z_{A1,l}, r_{A1,l});$$

$$C_{A2,u}(z_{A2,u}, r_{A2,u});$$

$$C_{A2,l}(z_{A2,l}, r_{A2,l});$$

of the areas of contact between the rolling bodies 21, 22, on the one hand, and the respective two raceways 19, 20, 25, 26 associated with them, on the other hand, also lie in each case on the same cylinder jacket surface of radius $r_A$, with the result that:

$$r_{A1,u} = r_{A1,l} = r_{A2,u} = r_{A2,l} = r_A$$

and $$r_{2,i,min} < r_{C1,R} = r_{C2,R} = r_{CB} = r_A < r_{1,o,max}.$$

Hence, the connecting lines between the two points of contact $r_{A1,u}$, $r_{A2,u}$ and $r_{B1,l}$, $r_{B2,l}$, respectively, of a ball 21, 22 with its two respective raceways 19, 25 and 20, 26 are parallel to the z-axis of the rolling bearing 1, that is, said connecting line intersects the base plane of the rolling bearing 1, which plane is transected perpendicularly by the z-axis, at a 90° angle. This angle corresponds to the contact angle of the two rows of rolling bodies 21, 22 of the rolling bearing 1.

The cross sections of the raceways 19, 20, 25, 26 surround the associated ball 21, 22 at, in each case, a respective circumferential angle of more than 90°, preferably more than 105°, particularly more than 120°. By the same token, the circumferential angle along which the cross sections of the raceways 19, 20, 25, 26 surround the associated ball 21, 22 should in each case be less than 180°, preferably less than 165°, particularly less than 150°. The drawing reflects an average value for this angle, of about 135°. The raceways 19, 20, 25, 26 in this case occupy roughly the entire radial extent of the associated flanks 19, 20, 25, 26, from the particular jacket surface 4, 5 to the bottom 18 of the depression 10 or to the radially inward boundary surface 17 of the elevation 16. The raceway cross sections 19, 20 on the inner ring 2 pass tangentially into the bottom surface 18 of the depression 10, whereas the raceway cross sections 25, 26 on the outer ring 3 pass roughly tangentially into the adjacent regions of the jacket surface 5.

The rolling bodies 24 of the third row have a roller-like, particularly cylindrical shape in the embodiment according to FIG. 1, with a cylinder axis that is parallel to the axis of rotation of the rolling bearing, and with a radius $r_{roller}$ that is preferably smaller than the ball radius $r_B$. These rollers 24 roll, on the one hand, on the radially inward boundary surface 17 of the projection 16 on outer ring 3, and on the other hand, on the raceway 23 at the bottom 18 of the depression 10. For axial guidance of the rollers 24 in the direction of the z-axis, raceway 23 is configured as a smaller, circumferential depression of approximately rectangular cross section, sunk into the bottom 18 of depression 10. This raceway depression 23 is located roughly centrally to the bottom surface 18 of depression 10, at roughly equal distances from the flanks 19, 20 of the depression 10. The axial extent of the raceway depression 23 along the z-axis is slightly larger than the corresponding extent of the rollers 24. The flanks of the raceway depression 23 are not intended to transmit forces. The sole purpose of the third row of rolling bodies 24 is to transmit radial forces between the two connecting elements 2, 3 or to center them in relation to each other. The contact angle of the rollers 24 is therefore approximately 0°.

To make it possible to assemble the connecting elements 2, 3 into the finished rolling bearing 1, with circumferential projection 16 engaging in circumferential depression 10, the ring 2 comprising depression 10 is configured as split, specifically along a base plane 27 of the bearing 1 that extends transversely to the axis of rotation thereof. This plane 27 extends along and just above or just below the third raceway 23. The two halves of the inner ring 2—the upper ring 28 and the lower ring 29—can be fastened together by means of screws, after which the outer ring 3 can be fitted between them, accompanied, where appropriate, by the rows of rolling bodies 21, 22, 24 held together by cages.

The axial extents of the two connecting elements 2, 3 in the direction of the roller axis are approximately equal; however, the two connecting elements 2, 3 are offset slightly from each other in the direction of the z-axis, such that the upper face 6 of one ring (preferably of inner ring 2) is raised with respect to the upper face 7[1] of the other ring (preferably of outer ring 3). To bring this about, its lower face 13 projects downward past the lower face of the first ring (preferably of inner ring 2). The raised faces 6, 13, respectively, form the two connection faces of the rolling bearing 1, to which can be fastened a respective one of the two system or machine components that are to be rotated in opposite directions. The fastening is done in each case by means of a plurality of fastening bores 30, 31, respectively, which are arranged coronally along the connecting elements 2, 3, and through each of which a fastening screw is to be passed. The respective fastening bores 30, 31 can be through-bores, as shown in FIG. 1, or they can be internally threaded blind bores.

[1] Translator's Note: Numeral sic. It appears to us that this should be "upper face 12."

The gap 11 between the connecting elements 2, 3 [is][2] sealed in the respective regions between the two upper faces 6, 12 and between the two lower faces 7, 13. Two sealing rings 32, 33 are preferably used for this purpose, each fastened to a respective connecting element 2, 3, preferably by the engagement of an anchoring projection in an anchoring groove of the same connecting element 2, 3, said anchoring projection having a larger cross section than the anchoring groove provided for it, and being anchored therein by elastic deformation. On the other side, the sealing rings 32, 33 rest against the respective other connecting element 2, 3, preferably via at least one sealing lip, which is pressed against the surface of the particular connecting element 2, 3 by virtue of a resilient or elastic property of the sealing rings 32, 33. The placement of the sealing rings 32, 33—i.e., of their anchoring projection and of their sealing lip(s)—is determined primarily by the particular non-raised face 7, 12 of the connecting elements 2, 3 and/or by one or both mutually facing jacket surfaces 4, 5 of the connecting elements 4, 5 [numerals sic]. In the embodiment shown in FIG. 1, the anchoring grooves for fastening the two sealing rings are both on outer ring 3.

[2] Translator's Note: The word is missing in the original.

The cavity formed in the region of the gap 11 and sealed by the two sealing rings 32, 33 is filled with a lubricant, preferably with lubricating grease, which can, for example, be dispensed through a lubricating nipple 34. The elasticity of the sealing rings 32, 33 is so adjusted that when an overpressure is exerted from the outside inward to the gap 11, they fit snugly in form closure, whereas if an opposite pressure is exerted, from the inside to the outside, they able to open once a threshold value is exceeded, so that as fresh lubricant is injected, the old lubricant is able to escape along the sealing lips of the sealing rings 32, 33.

Not illustrated is the fact that a circumferential set of teeth can be provided, as an application point for a drive pinion or a drive worm gear, on that jacket surface 35 of the non-split ring—outer ring 3, in the embodiment according to FIG. 1—which faces away from the gap 11. Since only outer ring 3 is suitable for the application of a worm gear, it is preferred that inner ring 2 be implemented as split, thus placing the depression 10 on inner ring 2 and the projection 16 on outer ring 3. The lubricating nipple 34 is then preferably disposed on that jacket side of the non-toothed connecting element 2, 3 which faces away from the gap, i.e., in the embodiment according to FIG. 1, on the inner surface 36 of inner ring 2.

If no teeth are required on outer ring 3, the above geometrical relationships can be reversed by replacing the depression 10 in the outer jacket surface 4 of inner ring 2 with a depression 10' in the inner jacket surface 5 of outer ring 3, and replacing an elevation 16 on the inner jacket surface 5 of outer ring 3 with an elevation 16' on the outer jacket surface 4 of inner ring 2. In this scheme, the geometry of elevation 16' can be exactly the same as the geometry of elevation 16 and the geometry of depression 10' can be exactly the same as the geometry of depression 10 without detracting from the functionality of the arrangement.

Figure 2:
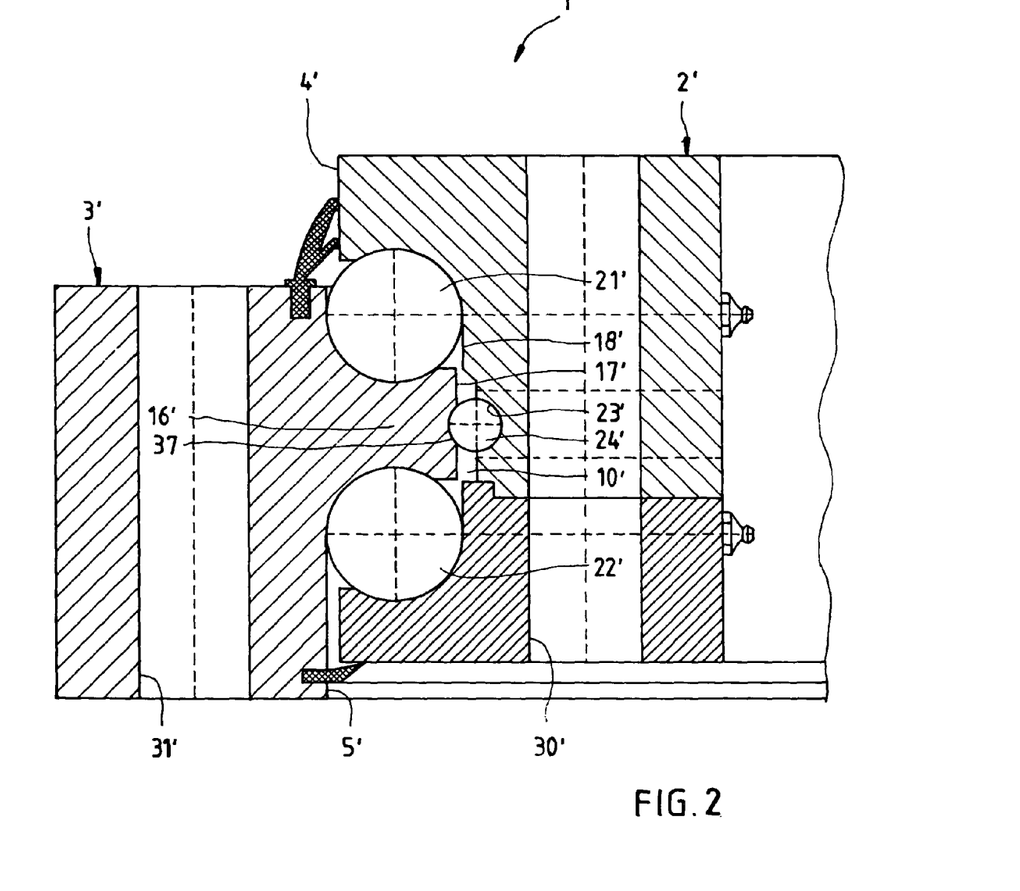
FIG. 2 is a representation, similar to that of FIG. 1, of another embodiment of the invention.

Embodiment 1' according to FIG. 2 differs from that of FIG. 1 chiefly in that the rolling bodies 24' of the third row, which is disposed in the axial direction between the other two rows of rolling bodies 21, 22, are configured not as roller-shaped but as spherical, the radius of the balls 24' being smaller than the radius $r_B$ of balls 21, 22. Raceway 23' thus has the shape of a sector of a circle[3]. In addition, an also circular-segment-shaped raceway 37 is provided in the end face 17' of the projection 16'. The raceways 23', 37 in this case are adapted to each other and to the radius of the balls 24' in such a way that their contact angle is approximately 0°.

[3] Translator's Note: Sic; "segment" was apparently meant, based on the drawing and the next sentence, which contains the unequivocal kreissegmentförmige (circular-segment-shaped). The word used here for "circular sector," Kreisausschnitt, is very similar to another choice for "circular segment," Kreisabschnitt.

Figure 3:
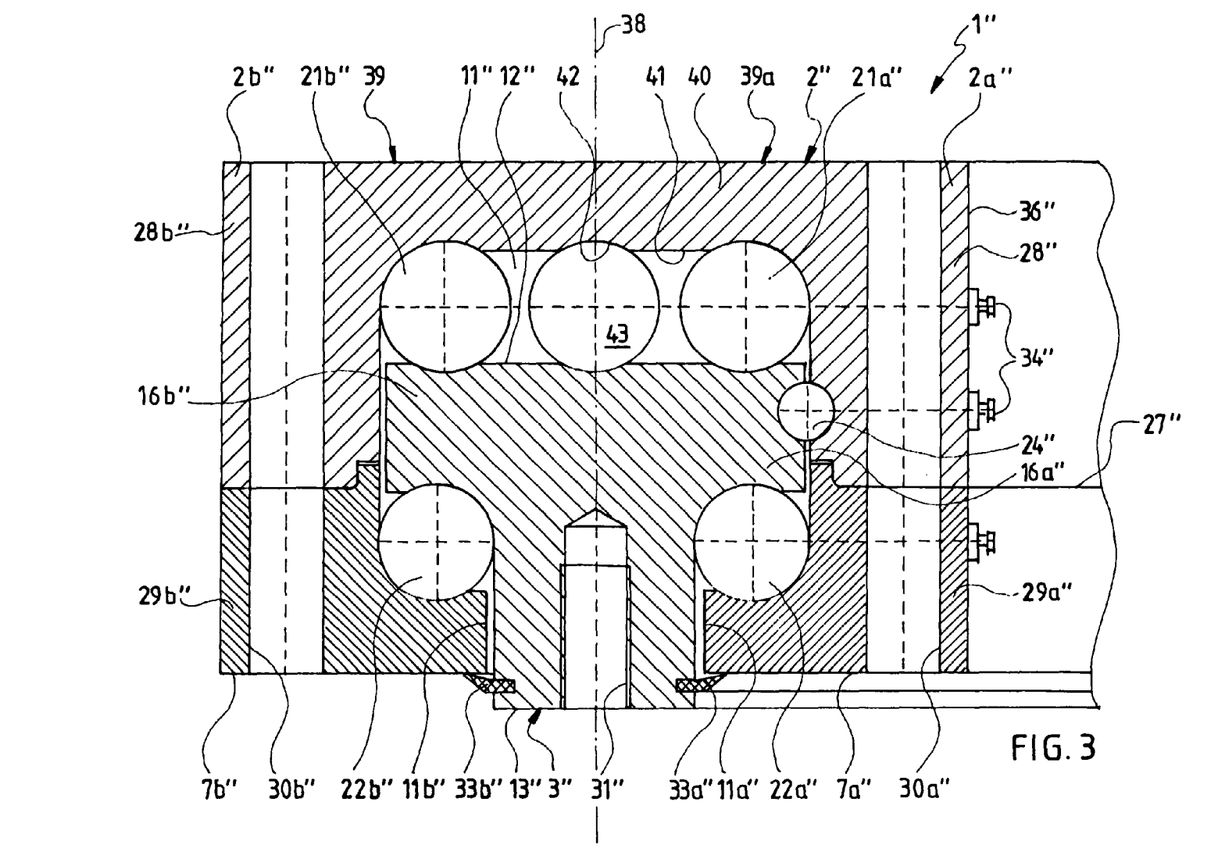
FIG. 3 is a further-modified embodiment of the invention, in a representation similar to that of FIG. 1.

Bearing embodiment 1" according to FIG. 3 represents a refinement of rolling bearing 1' from FIG. 2. Here, instead of an inner ring 2' and an outer ring 3', there are a ring 3" that is embraced both inwardly and outwardly, i.e. bilaterally, and a ring 2" that bilaterally embraces it. A cross section through these two rings 2", 3" reveals nearly complete symmetry with respect to a center axis 38 that is parallel to the axis of rotation of the bearing 1". In this connection, the right half 39a of the cross section illustrated in FIG. 3 corresponds to that portion of the bearing 1" which is farther inward radially, while the left cross-sectional half 39b of FIG. 3 corresponds to that portion of bearing 1" which is farther inward[4] radially; however, both annular connecting elements 2", 3" have roughly equal shares of these two cross-sectional regions 39a, 39b of the bearing.

[4] Translator's Note: Sic; "inward" in both cases. "Outward" was intended in this case (re the left half), as is clear from the paragraph after next.

A comparison of the right or radially inward cross-sectional half 39a of the bearing 1" of FIG. 3 with the bearing 1' of FIG. 2 shows these regions are identical to each other except in nonessential details (the position of the lubricating nipple, etc.). Particularly noteworthy are the division of the innermost, embracing ring portion 2a", along a plane 27" parallel to the base plane of the bearing 1", into an upper ring portion 28a" and a lower ring portion 29a", both of which are penetrated by axis-parallel openings that complement each other to form through-passing fastening bores 30a"; further, a radially inwardly projecting projection 16a" on the embraced connecting element 3"; moreover, the rows of high-contact-angle rolling bodies 21a" and 22a" that are offset from each other in the axial direction, and a row of low-contact-angle rolling bodies 24" disposed between them; and finally, a sealing ring 33a" in the region of the orifice of a gap portion 11a".

As FIG. 3 further shows, nearly all these elements in the right cross-sectional half 39a each have a respective symmetrical counterpart in the left or radially more outward cross-sectional half 39b: the outermost ring portion 2h" is split along plane 27" into an upper ring portion 28b" and a lower ring portion 29b", which are penetrated by common through-passing openings 30b"; bilaterally embraced connecting element 3" has a radially outward protruding projection 16b"; in gap portion 11b" there are two rows of high-contact-angle rolling bodies 21b" and 22b" offset from each other in the axial direction, and a sealing ring 33b" in the region of the orifice of gap 11b". The only counterpart that is not present is one for the row of low-contact-angle rolling bodies 24", together with any appropriate counterparts to the lubricating nipples 34".

The two projections 16a", 16b", which point in opposite directions—i.e., radially outward and radially inward, respectively—are joined directly to an end face 12" of the bilaterally embraced connecting element 3", thus giving this connecting element 3" a roughly T-shaped cross section.

This end face 12" of the bilaterally embraced connecting element 3" is completely surrounded by a joint region 40 between the ring halves 2a", 2b" of bilaterally embracing connecting element 2". The inner surface 41 of this joint region 40, i.e., that which faces end face 12", extends parallel to end face 12" of bilaterally embracing connecting element 3". Centered on the axis of symmetry 38, the two mutually opposite end faces 12", 41 each have a raceway depression 42 for a further row of high-contact-angle rolling bodies 43. Thus, three rows of rolling bodies 21a", 21b", 43 are disposed concentrically to one another on this plane.

The rolling bodies 21a", 21b", 43 in these three rows are approximately, but preferably exactly, equal in size, with the result that the load-bearing capacity of the bearing 1" in the axial compression direction is roughly tripled in comparison to bearing 1'; since the number of lower rows of rolling bodies 22a", 22b" is doubled, the transmissible axial traction force is approximately twice that of which bearing 1' is capable, whereas the maximum radial force is approximately exactly the same as in the case of a bearing 1' from FIG. 2 of the same structural size.

Whereas bilaterally embracing connecting element 2" has two crowns of through-passing fastening bores 30a", 30b", bilaterally embraced connecting element 3" preferably has only one crown of fastening openings 31", which are preferably at exactly the same radial distance from the axis of rotation of the bearing 1" as the axis of symmetry 38, although naturally more than one such crown-shaped series of holes could also be present. In any case, these fastening openings are preferably 31" [sic] configured not as through-passing openings but as blind bores, which are open in the direction of connection surface 13" and are provided with an internal thread.

Correlatively to the symmetrical cross-sectional halves 39a, 39b, here there are also two sealing rings 33a", 33b", one on each side of connection surface 13" of bilaterally embraced connecting element 3". These are preferably constructed as mutually symmetrical and are each anchored in a groove in the particular jacket of bilaterally embraced connecting element 3"; the sealing lip of each is pressed elastically against the respective lower end face 7a", 7b".

The thereby completely sealed gap 11" is filled with lubricant, preferably lubricating grease. To dispense the lubricating grease, lubricating nipples 34" are provided, preferably on an accessible jacket side 36" of bilaterally embracing connecting element 2". A circumferential sprocket can, if necessary, be provided on the opposite jacket side of this connecting element 2".

The invention claimed is:

1. A bearing assembly for a wind power installation, comprising a rolling bearing having a diameter of at least 0.5 m, and a rotary joint of a blade of the wind power installation, the bearing assembly comprising two annular connecting elements (2, 3) adapted for connection each to a respective one of two oppositely rotatable system components, and defining a gap (11) between said connecting elements (2, 3), said connecting elements being adapted to rotate in opposite directions about an axis located at a center of said annular connecting elements (2, 3) and extending generally perpendicularly to a ring plane of the assembly, and at least two rows of rolling elements (21, 22; 24) provided in the gap (11) between said connecting elements (2, 3), wherein
   a) said annular connecting elements (2, 3) at least partially overlap each other in a radial direction, and
   b) one or more raceways (19, 20, 25, 26) for said rolling elements (21, 22) are arranged in radially overlapping regions (10) of said annular connecting elements (2, 3), such that a contact angle which a connecting line between centers of points of contact of said rolling element (21, 22) with two raceways (19, 25; 20, 26) for said rolling element (21, 22) makes with the ring plane is at least 75°, and
   c) wherein rolling elements (24) of at least one of said at least two rows of rolling elements (21, 22; 24) have a contact angle of no more than 15°.

2. The bearing assembly as in claim 1, wherein one of said annular connecting elements (2, 3) is provided with at least one circumambient region (10, 16) which faces another one of said annular connecting elements, and at least one of said raceways (19, 20; 25, 26) is embraced by said other connecting element.

3. The bearing assembly as in claim 2, wherein said one of said annular connecting elements is provided with said at least one circumambient region (10; 16) which faces another circumambient region and both raceways are defined by said connecting elements (2, 3).

4. The bearing assembly as in claim 3, wherein a region of said one of said connecting elements that is embraced on a raceway side thereof by said other one of said connecting elements is configured as the at least one circumambient region (16) that extends in the radial direction toward the other said connecting elements.

5. The bearing assembly as in claim 4, wherein the raceways (25, 26) of at least one of said circumambient regions (16) comprise raceways for said rolling elements (21, 22).

6. The bearing assembly as in claim 5, wherein at least one raceway for at least one further row of rolling elements (24) is provided in an end face (17) of at least one of the circumambient regions (16).

7. The bearing assembly as in claim 1, wherein one of said annular connecting elements (2, 3) is provided with a generally C-shaped cross section with at least two circumambient regions facing the other connecting element and into the circumambient region (10) between which a portion of the other connecting element extends.

8. The bearing assembly as in claim 7, wherein one of said raceways (19, 20) for a row of said rolling elements (21, 22) is disposed on each of two mutually facing inner surfaces of said connecting elements (2, 3) and is provided with a C-shaped cross section.

9. The bearing assembly as in claim 8, wherein at least one raceway (23) for at least one further row of the rolling elements (24) is provided in a region of at least one depression (10) between two raised regions (4) of said connecting elements (2, 3).

10. The bearing assembly as in claim 8, wherein said connecting element (2) comprises two mutually separate, superposed individual rings (28, 29).

11. The bearing assembly as in claim 8, wherein one of said connecting elements (2, 3) embraces the other connecting element radially.

12. The bearing assembly as in claim 8, wherein said rolling elements (21, 22) comprise balls.

13. The bearing assembly as in claim 8, wherein said rolling elements (24) comprise a selected one of rollers, drums and balls.

14. The bearing assembly as in claim 8, wherein said raceways are mutually facing raceways (19, 25; 20, 26; 23", 37) for receiving a common row of the rolling elements (24) and are provided with a circular-segment-shaped cross section whose transverse radius of curvature is larger than a radius of an associated rolling element.

15. The bearing assembly as in claim 14, wherein centers of mutually corresponding raceway cross sections are generally equidistant from an axis of rotation of said rolling bearing.

16. The bearing assembly as in claim 1, wherein a width (w) of the radial overlap is greater than half the extent of said rolling element (21, 22) in the direction of the axis of rotation of said rolling bearing.

17. The bearing assembly in accordance with claim 1, wherein at least one row of low-contact-angle rolling elements (24) is disposed in an axial direction between two rows of the rolling elements (21, 22).

18. The bearing assembly as in claim 17, wherein said row of low-contact-angle rolling elements (24) is disposed generally at a level of a split (27) in said connecting element (2, 3).

19. The bearing assembly in accordance with claim 18, wherein the sealed gap (11) between said connecting elements (2, 3) is at least partly filled with a lubricant.

20. The bearing assembly in accordance with claim 18, wherein the jacket side (35, 36) of at least one of the connecting elements (2, 3) is provided with teeth.

21. The bearing assembly as in claim 1, wherein on one base side of said rolling bearing, an end face of one of said connecting elements (2, 3) is raised.

22. The bearing assembly in accordance with claim 1, wherein on one base side of said rolling bearing, an end face of a first of said connecting elements (2, 3), which is raised, completely embraces in a radial direction an end face of a second of said connecting elements (2, 3).

23. The bearing assembly in accordance with claim 1, wherein said connecting elements (2, 3) are provided with coronally distributed bores (30, 31) for receiving fastening screws.

24. The bearing assembly as in claim 23, wherein said coronally distributed bores (30, 31) of said connecting elements (2, 3) are configured as internally threaded blind bores.

25. The bearing assembly in accordance with claim 1, wherein the gap (11) between said connecting elements (2, 3) is sealed at annular orifices thereof.

26. The bearing assembly in accordance with claim 25, wherein said gap (11), between said connecting elements (2, 3) is sealed on both base sides of said rolling bearing by at least one sealing ring (32, 33) in a region of each step between a raised connecting element and the other connecting element.

27. The bearing assembly in accordance with claim 26, wherein said gap between said two connecting elements is sealed both a radially inward-lying and at a radially outward-lying orifice by a sealing ring.

28. The bearing assembly as in claim 27, wherein two sealing rings each rest against a jacket side of one of said connecting elements and against an adjacent end-face region of said other one of said connecting elements.

29. The bearing assembly as in claim 28, wherein said sealing rings are each provided with a sealing lip that is elastically pressed against an adjacent portion of an end face of said connecting element.

30. The bearing assembly as in claim 27, wherein at least one sealing ring is anchored to a jacket side of one of said connecting elements by being seated in a groove thereof.

* * * * *